United States Patent [19]

Grynberg

[11] Patent Number: 4,601,011
[45] Date of Patent: Jul. 15, 1986

[54] USER AUTHORIZATION VERIFICATION APPARATUS FOR COMPUTER SYSTEMS INCLUDING A CENTRAL DEVICE AND A PLURALITY OF POCKET SIZED REMOTE UNITS

[76] Inventor: Avigdor Grynberg, 23 Hagderoth Street, Savyon, Israel

[21] Appl. No.: 712,903

[22] Filed: Mar. 18, 1985

Related U.S. Application Data

[63] Continuation of Ser. No. 454,180, Dec. 28, 1982, abandoned.

[30] Foreign Application Priority Data

Dec. 31, 1981 [IL]  Israel .................................. 64675

[51] Int. Cl.⁴ ........................ G06F 13/14; G06F 15/21
[52] U.S. Cl. ......................................... 364/900; 455/26
[58] Field of Search .............. 178/22.01, 22.08, 22.09, 178/22.14; 235/379, 380, 382; 325/55; 340/825.34, 825.44, 825.49, 825.54, 825.55; 364/200, 406, 900; 455/31, 26

[56] References Cited

U.S. PATENT DOCUMENTS

| | | |
|---|---|---|
| 3,594,727 | 7/1971 | Braun . |
| 3,764,742 | 10/1973 | Abbott et al. . |
| 3,798,605 | 3/1974 | Feistel . |
| 3,976,840 | 8/1976 | Cleveland et al. ............... 364/900 |
| 4,129,855 | 12/1978 | Rodrian ........................... 340/825.54 |
| 4,178,476 | 12/1979 | Frost ................................ 340/825.49 |
| 4,203,166 | 5/1980 | Ehrsam et al. .................... 178/22.09 |
| 4,218,738 | 8/1980 | Motyas et al. . |
| 4,247,908 | 1/1981 | Lockhart, Jr. et al. ........... 364/900 |
| 4,272,819 | 6/1981 | Katsumata et al. ............... 364/200 |
| 4,277,837 | 7/1981 | Stuckert . |
| 4,293,909 | 10/1981 | Catiller et al. .................... 364/200 |
| 4,295,039 | 10/1981 | Stuckert ........................... 364/900 |
| 4,315,101 | 2/1982 | Atalla . |
| 4,317,957 | 3/1982 | Sendrow .......................... 340/825.34 |
| 4,320,810 | 3/1982 | Bouricius et al. ................ 364/200 |
| 4,349,695 | 9/1982 | Morgan et al. .................. 178/22.08 |
| 4,360,875 | 11/1982 | Behnke ............................ 364/900 |
| 4,365,110 | 12/1982 | Lee et al. ......................... 178/22.09 |
| 4,386,233 | 5/1983 | Smid et al. ....................... 178/22.14 |
| 4,393,461 | 7/1983 | Holtey et al. .................... 364/900 |
| 4,408,203 | 10/1983 | Campbell ......................... 340/825.34 |
| 4,418,382 | 11/1983 | Larson et al. .................... 364/200 |
| 4,423,287 | 12/1983 | Zeidler ............................. 340/825.34 |

FOREIGN PATENT DOCUMENTS

| | | |
|---|---|---|
| 1422217 | 1/1976 | United Kingdom . |
| 2015221 | 9/1979 | United Kingdom . |
| 1596485 | 8/1981 | United Kingdom . |
| 1595797 | 8/1981 | United Kingdom . |
| 1595796 | 8/1981 | United Kingdom . |
| 2102996 | 2/1983 | United Kingdom . |

Primary Examiner—Thomas M. Heckler
Attorney, Agent, or Firm—Finnegan, Henderson, Farabow, Garrett & Dunner

[57] ABSTRACT

A remote user authorization verification system including a central device having data imput and output, memory and data comparison facilities, and a plurality of hand held, pocket size remote units arranged for data communication with the central device by means of conventional telecommunications devices, such as a telephone, the pocket size remote units having information input keying apparatus, memory apparatus and enciphering apparatus and being operative for providing an enciphered verification code to the central device for verification of the authorized status of the user.

17 Claims, 7 Drawing Figures

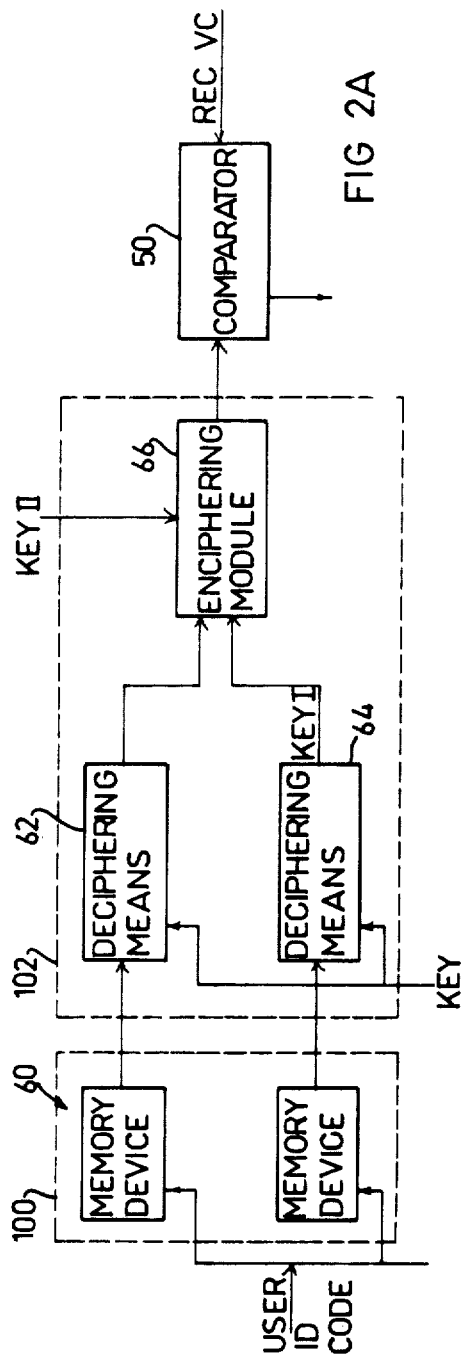
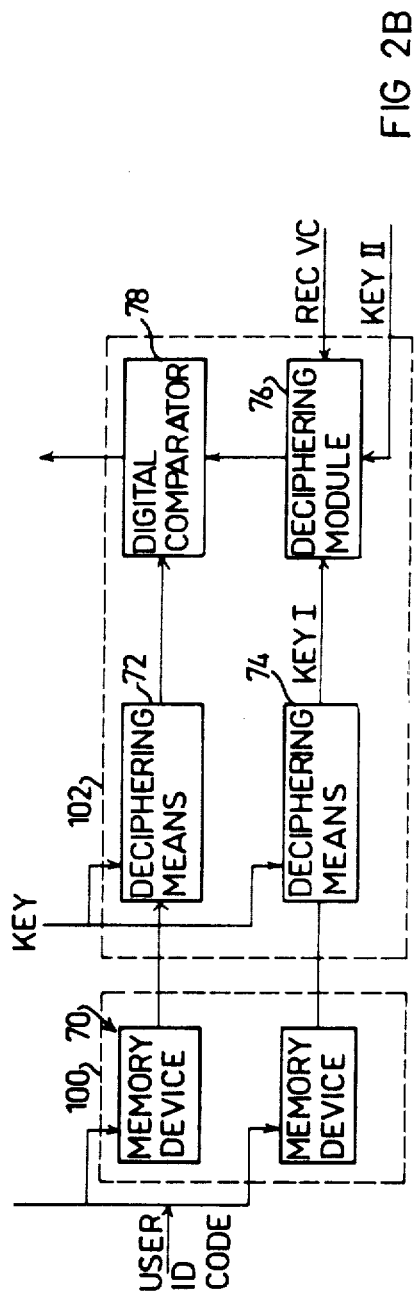

4,601,011

USER AUTHORIZATION VERIFICATION APPARATUS FOR COMPUTER SYSTEMS INCLUDING A CENTRAL DEVICE AND A PLURALITY OF POCKET SIZED REMOTE UNITS

This application is a continuation, of application Ser. No. 454,180, filed Dec. 28, 1982, now abandoned.

FIELD OF THE INVENTION

The present invention relates to data communications generally and more particularly to apparatus and techniques for providing an indication of the authorized status of users of data communications systems.

BACKGROUND OF THE INVENTION

With the advent of increasingly widespread computer usage, data communications have become a part of the daily lives of a significant and growing portion of the population. In the conduct of such data communications, particularly for such activities as banking by telephone, positive identification of the user becomes imperative.

Various techniques have been proposed for providing positive identification of users of data communications and processing systems.

U.S. Pat. No. 3,594,727 describes a credit card banking system in which a peripheral terminal receives separate identification codes from a credit card and from a secret number punched in by the customer. These codes are transmitted to a central location that verifies the pairing.

U.S. Pat. No. 3,798,605 describes a multi-terminal data processing system including apparatus for verifying the identity of subscribers and includes two embodiments. In one embodiment, termed a "password" system, all data or information originating at the terminal under use of the subscriber is enciphered in combination with the unique subscriber key. In the second embodiment, termed a "handshaking" system, the user and the central processor exchange a plurality of messages, each formed by a combination of new and prior received data, identifying the subscriber.

U.S. Pat. No. 3,764,742 describes a cryptographic idetification system which employs a "credit card" having a personalized read only storage device implemented thereon. The card holds the read only storage associated logic and devices to utilize the read only storage to generate pseudo-random strings of code data. The pseudo-random code is mixed with data which may be transmitted to a computer. The computer contains a pattern of the user's individual read only storage and it operates in sequence to generate the same pseudo random dom string of bits to decrypt the mixed encrypted data from the user. Access to the central processing unit is controlled by means of an access code memorized by the user.

U.S. Pat. No. 4,218,738 describes a method for authenticating the identity of a user of an information system which employs a verification pattern which is a function of a potential computer user's identity number, the potential computer user's separately entered password, and a stored test pattern. The verification pattern is generated under secure conditions to prevent compromise thereof.

There are known telecomputing keyboards of relatively small but not pocket size, with associated displays, and which are arranged for communication with a computer over ordinary telephone lines.

U.S. Pat. Nos. 4,295,039 and 4,277,837 describe a personal portable terminal for financial transactions, which is larger than pocket size and is designed for proximity engagement with a remote transaction terminal. In both embodiments, the memorized password is subject to compromise if access is gained to the remote transaction terminal.

U.S. Pat. No. 4,315,101 illustrates a method and apparatus for securing data transmissions which employs encryption of a verification code. The encryption method requires a synchronized communication regimen with feedback.

SUMMARY OF THE INVENTION

The present invention seeks to provide apparatus and techniques for data communication including positive user authorization status which go beyond the teachings of the prior art reviewed above.

There is thus provided in accordance with a preferred embodiment of the present invention, a remote user authorization verification system including a central device having data input and output, memory and data comparison facilities, and a plurality of hand held, pocket size remote units arranged for data communication with the central device by means of conventional telecommunications devices, such as a telephone, the pocket size remote units having information input keying apparatus, memory apparatus and enciphering apparatus and being operative for providing an enciphered verification code to the central device for verification of the authorized status of the user.

Further in accordance with a preferred embodiment of the present invention, the remote units are operative to produce a non-repeating enciphered verification code in response to inputting of a memorized code through the information input keying apparatus. In one embodiment, the verification code is a function of the memorized code. Alternatively and preferably, the verification code is entirely unrelated to the memorized code and may be unknown to the user. Inputting of the memorized code acts merely as a trigger to the remote unit to generate the verification code.

Further in accordance with a preferred embodiment of the present invention, the central device is provided with voice generation apparatus for providing information to the user via the telecommunications device without requiring a display.

In accordance with another preferred embodiment of the present invention there is provided a multilevel remote verification code authentication system comprising a central computing facility, access to which is to be controlled, at least one remote communications terminal arranged for communication with the central computing facility in accordance with a first verification code regimen, and a plurality of remote units arranged for communication with the remote communications terminal in accordance with a second verification code regimen. Proper identification of the user to the remote communications terminal in accordance with the second verification code regimen accesses the user to the central computing facility on the basis of a verification code specific to the remote communications terminal and not specific to the individual user or known by him. This system has the advantage that changes of the roster of authorized users need be done only within the framework of the second regimen and not within the framework of the first regimen.

Further in accordance with this embodiment of the invention, the remote identification units may be pocket size remote units as described above.

Additionally in accordance with another preferred embodiment of the present invention, a multiple network, multilevel remote verification code system is provided wherein there are provided a plurality of central computing facilities, each with at least one remote communications terminal, and a plurality of remote units, each arranged for communication selectably with each of the plurality of remote communications terminals by means of a communicator-specific verification code output specific to each of the remote communications terminals or to each of the central computing facilities. The communicator-specific verification code may be selected by the user or provided in response to a handshakeing type of communication between the remote unit and the communications terminal.

Further in accordance with an embodiment of the present invention, the remote unit may communicate selectably directly with a remote terminal or directly with the computing facility by means of a telecommunications link.

Additionally in accordance with an embodiment of the invention, tamper resistant sealing devices may be associated with code verification apparatus located at the remote unit, the computing facility and the remote terminal to prevent unauthorized access thereto.

Further in accordance with an embodiment of the invention, apparatus may be provided for providing an alarm indication upon entry of incorrect memorized code information to the remote unit, indicating unauthorized use. Preferably, the alarm indication is a silent alarm which is communicated to the computing facility. There are also provided, in accordance with an embodiment of the invention, means for erasing the memory of the remote unit in response to unauthorized tampering therewith.

BRIEF DESCRIPTION OF THE DRAWINGS

The present invention will be understood and appreciated more fully from the following detailed description taken in conjunction with the drawings in which:

FIGS. 2A and 2B are detailed block diagram illustrations of two alternative embodiments of data comparison apparatus useful in the invention;

DETAILED DESCRIPTION OF THE INVENTION

Figure 1:
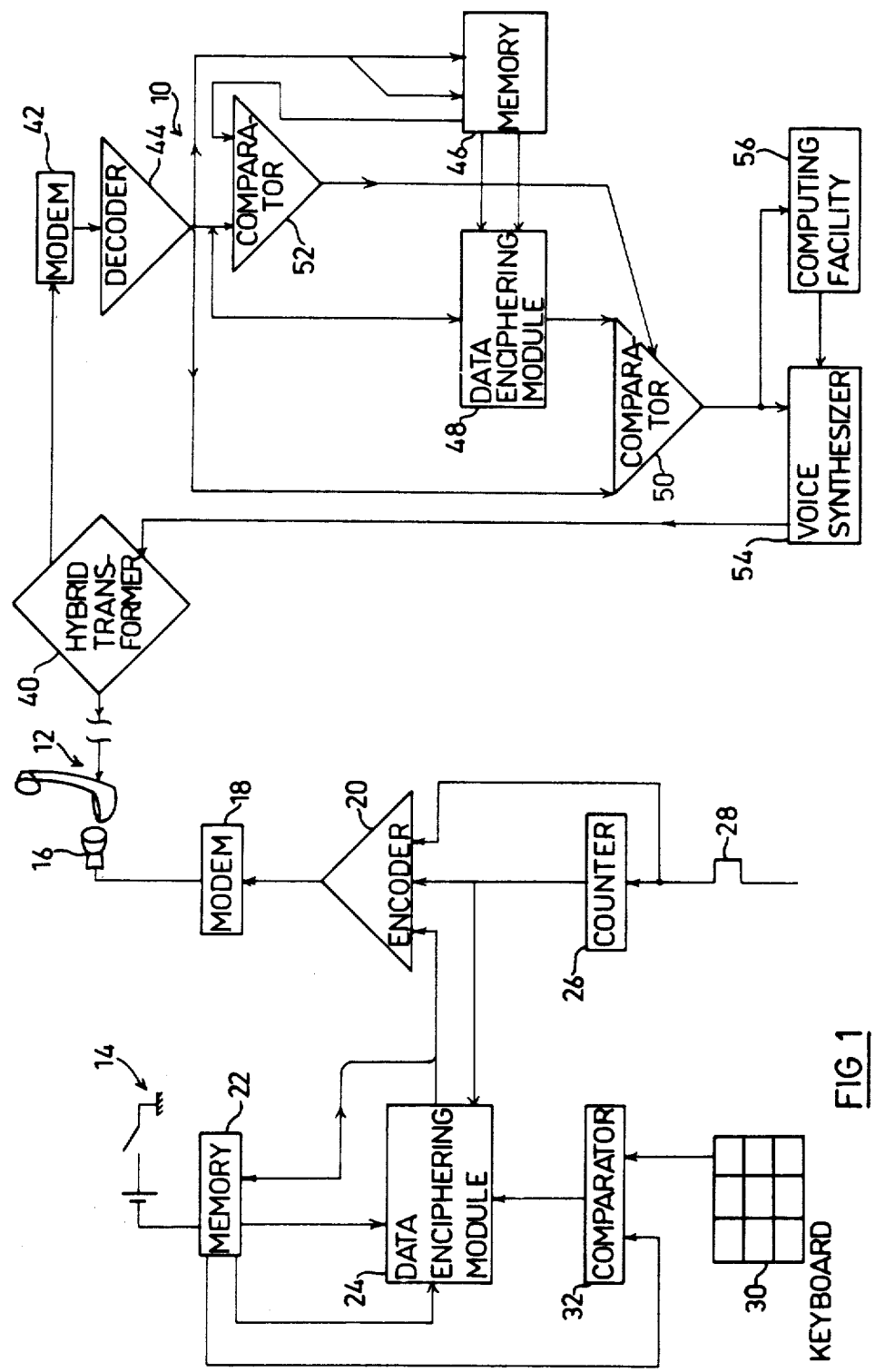
FIG. 1 is a block diagram illustration of a preferred embodiment of the invention.

Reference is now made to FIG. 1 which is a block diagram illustration of a verification system constructed and operative in accordance with a preferred embodiment of the present invention. Generally described, the system comprises a code verification device 10 which is coupled via conventional communications apparatus, such as a conventional telephone line and handset 12 to remote unit 14. As will be described hereinafter in greater detail, the code verification device may be embodied in a central computing facility or in a remote terminal thereof.

The remote unit 14 comprises a transducer 16, such as a loudspeaker, which is connected to a modem 18, such as a MC 6860. Modem 18 receives coded information for transmission from an encoder 20, such as an AY-5-1013, which is operative to assemble a message from received outputs of a memory 22, such as a CD4076, a data enciphering module 24, such as an i8294, a counter 26, such as a CD 4024, and a transmit key 28. According to a preferred embodiment of the present invention, the data enciphering module 24 is operative in response to a trigger input resulting from entry of a correct memorized password, to produce a verification code for transmission.

A keyboard 30, included in the remote unit 14, is operative for entry of the memorized password by a user into a comparator 32 which receives a reference password from memory 22. In response to receipt of the correct password, matching the reference password, comparator 32 provides the trigger signal input to the enciphering module 24 causing it to transmit the verification code, which may also be stored in memory 22.

In order to obviate the need for synchronization of the enciphering module with a corresponding module in the central device 10, the enciphering mechanism therein is restarted each time it is to generate a code. In order to provide a different verification code for each transmission, so as to avoid detection of the verification code by unauthorized interception thereof, a two part key is employed. A first part of the key is fixed and is stored in memory 22, while the second part is stored in counter 26. Counter 26 is operative to increment its contents upon each actuation of transmit key 28. In order to enable deciphering of the verification code at the central device, the part of the key stored in the counter is transmitted along with the verification code.

A user identification code is stored in memory 22 and is transmitted along with the verification code. The received user identification code serves as an index for retreiving a reference verification code, a first key part and a sequence check key at the verification device 10.

Verification device 10 comprises a hybrid transformer 40 which converts the two lines of a standard telephone connection to a four line connection. Received audio tones are demodulated by a modem 42, such as a MC6860, and then decoded by a decoder 44, such as a MC6850 serial to parallel converter and error checking device.

The decoded data output of decoder 44 is split into three parts, the user identification code, the second key part and the enciphered verification code. The user identification code is supplied to a memory 46, such as a magnetic disk storage system and operates as an index for retreiving the reference verification code and corresponding first key part data which are specific to each user identification code.

Memory 46 is operative to output the first key part and the reference verification code to a data enciphering module 48 which generates an enciphered version of the reference verification code. This enciphered version is supplied to a comparator 50, such as a CD 4063, which also receives the transmitted enciphered verification code from decoder 44.

In order to ensure that the second part of the key is not a previously used second part, a comparator 52 compares the previously received second part, stored in memory 46, with the currently received second part. If a predetermined difference exists between them, such as typically, that the currently received second part is greater than the preceding second part, comparator 52 provides an enable signal to comparator 50, permitting operation thereof.

If the two verification codes are the same, comparator 50, upon being enabled, provides a verification code receipt output signal to a voice synthesizer 54, such as a TMS 5100, for providing an acknowledge message and to a computing facility 56. The operation of the voice synthesizer may be controlled by computing facility 56, which may also control other operations of the verification device 10.

The synthetic voice output from synthesizer 54 is supplied via hybrid transformer 40 and via the telecommunications link 12 to transducer 14.

The verification code receipt output signal from comparator 50 is supplied as an access approval signal to utilization apparatus such as computer apparatus, including, for example, banking apparatus, permitting the carrying out of transactions in response to instructions received from the remote unit, which instructions are preferably entered via keyboard 30.

Figure 6:
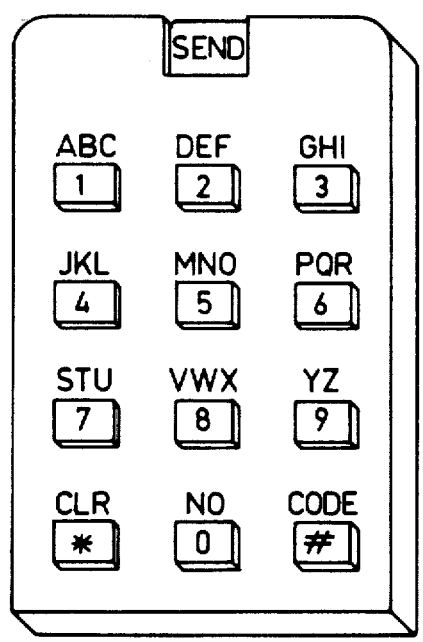
FIG. 6 is a pictorial illustration of a remote unit constructed and operative in accordance with the present invention.

It is a particular feature of the present invention that a synthetic voice generator is included in the system, since this greatly simplifies the remote unit and enables it to work with any telephone receiver anywhere, without requiring special interfaces, based on conventional acoustic coupling. This structure also obviates the need for a display in the remote unit and thus enables the remote unit to be relatively small. The small size of the remote unit is also an important feature thereof since it enables the unit to be carried conveniently in the pocket of a user. Thus the dimensions of the unit should preferably not exceed approximately 2.5×3 inches. The unit should be light and battery powered. A pictorial illustration of such a unit is provided in FIG. 6.

It will be appreciated by persons skilled in the art that the generation of the second part of the key may be done in a variety of ways and in manners more complex than that disclosed herein. Alternatively, the second part of the key may be generated at the central device 10 and transmitted to the remote unit by means of the synthesizer 54. The operator of the remote unit can then enter the second part of the key via the keyboard. The second part of the key may be, for example, the current date or hour. In such an embodiment, counter 26 may be eliminated.

According to a further alternative embodiment of the invention, the acoustic coupling and voice synthesis may be replaced by the provision of a display at the remote unit. In such a case, the information inputs may be entered through the telephone push button dialing system.

Reference is now made to FIG. 2A which illustrates a preferred embodiment of data comparison system useful in the apparatus of FIG. 1. Here, the reference verification code and the first part of the key are stored in a memory device 60 which may be a magnetic disk, in an enciphered form. Upon receipt of the user identification code from the remote unit, the enciphered verification code and first part are retreived and deciphered in deciphering means 62 and 64, typically embodied in an i8294 chip, incorporating sequencing logic. The key which is utilized by the deciphering means is essentially different from the other keys and may be the same key for all of the user identification codes. The clear text verification code is then reenciphered by an enciphering module 66, such as an i8294, employing the clear text first part and the variable second part of the key. The enciphered reference verification code is then compared with the received enciphered verification code at comparator 50, as described above.

FIG. 2B illustrates an alternative embodiment of data comparison means wherein the enciphered verification code and first key part are stored in memory 70 and deciphered by deciphering means 72 and 74, similarly to the embodiment of FIG. 2A. A deciphering module 76, typically an i8294 receives the first and second keys and the received enciphered verification code and provides an output of the clear text verification code to a digital comparator 78 which compares it with the clear text verification code retreived from memory 70.

Other types of comparison techniques may alternatively be employed. A further example is that described in the publication of IEEE Comm. Soc. of Nov. 1978 at pages 24–32.

Figure 3:
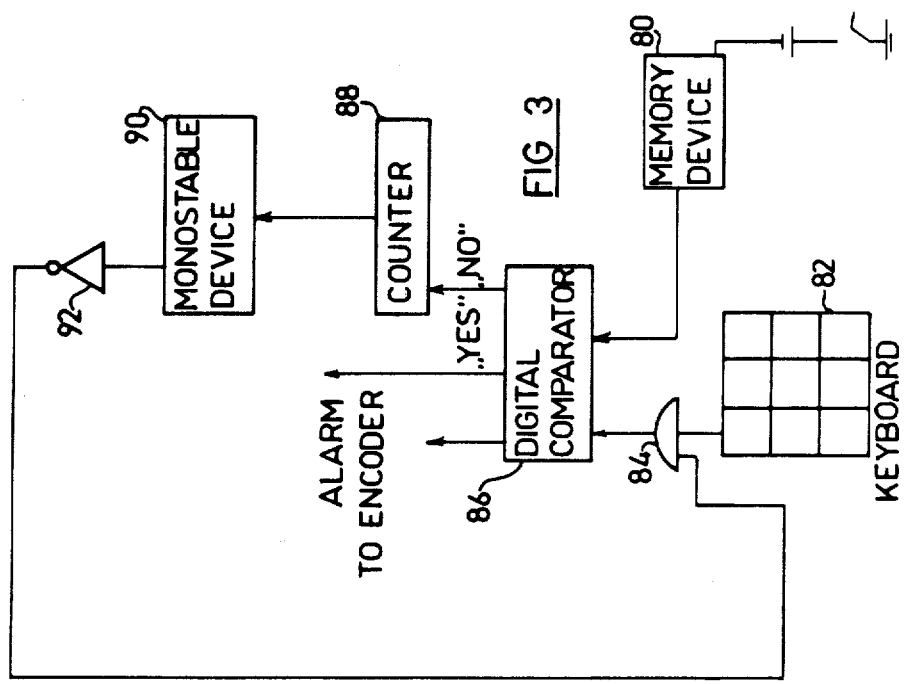
FIG. 3 is a block diagram illustration of a remote unit verification system constructed and operative in accordance with a preferred embodiment of the present invention.

Reference is now made to FIG. 3 which illustrates a preferred embodiment of remote unit, which provides for verification of a password at the remote unit and transmission of a verification code, preferably not known to the operator of the remote unit.

The apparatus of FIG. 3 comprises a memory device 80, such as a CD 4076, which stores a reference password. A keyboard 82 is provided for receiving a keyed in password and transmitting it via an AND gate 84 to a digital comparator 86, such as a CD 4063. The keyed password and the reference password stored in memory 80 are compared at comparator 86. If they are identical, a suitable output signal is provided. This output signal is then used to generate a verification code for transmission. If they are not identical, a signal is provided to a counter 88, such as a CD4024, for incrementing the counter. Upon reaching a predetermined count, the counter output triggers a monostable device 90, such as a CD4047. The monostable device 90 provides an output which is inverted by an inverter 92, which inverted output is operative to block operation of the AND gate 82. This blocking prevents further use of the remote device and consequent operation thereof by trial and error guessing. Alternatively the output of the counter may cause erasure of the memory or cause a alarm report to be sent to the computing facility.

Additionally security features may be provided by equipping the apparatus with subhousings 100 and 102, indicated in dashed lines in FIGS. 2A and 2B. These subhousings may be provided with tamper proof switch which disable the device or send an alarm message in response to tampering. The remote units may be provided with similar tamper proof enclosures. The alarm message is preferably silent and is effective to disable use of the element tampered with.

Figure 4:
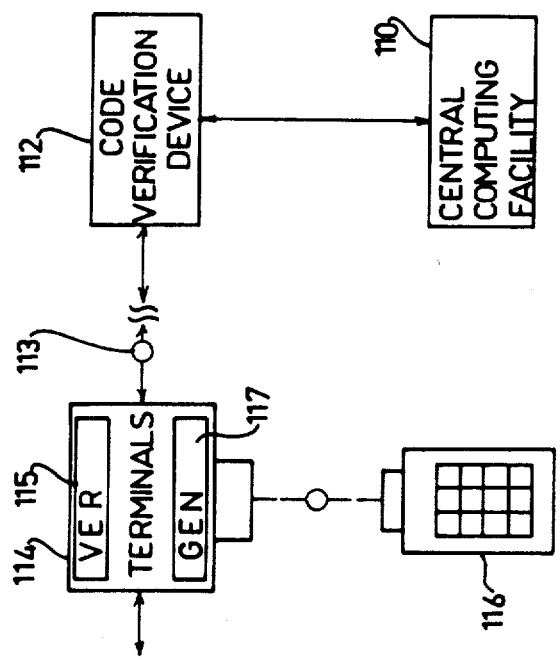
FIG. 4 is a block diagram illustration of a multi-level verification system constructed and operative in accordance with an embodiment of the present invention.

Reference is now made to FIG. 4 which is a block diagram illustration of an additional alternative embodiment of the present invention wherein a multi-level verification system is provided. In accordance with this embodiment there is provided a central computing facility 110 having an associated code verification device 112 of the type illustrated in FIG. 1. A plurality of terminals 114 are connected thereto as by one or more dialable telephone circuits in accordance with a first verification code regimen. For example, the central computing facility may be that of a bank and each of the plurality of terminals may be located in a different business, being a client of the bank.

Associated with each of the terminals are a plurality of remote units 116 which may be of the type described hereinabove in connection with FIGS. 1-3 and 6. These devices each communicate with the remote terminal via a second verification code distinct from the first verification code regimen. The first verification code regimen may be understood to employ a code system which is controlled by the code verifier 112, while the second verification code regimen may be understood to employ a code system which is controlled by the remote terminal. Access to one code system does not provide access to the other code system.

It is appreciated that the remote terminal includes a code verification device 115 similar to device 112 operating on the second verification code regimen and a verification code generating device 117 similar to that shown as part of the remote unit in FIG. 1 operating on the first verification code regimen.

Acceptance by the remote control terminal of the second verification code accesses the user to the central facility, but without the verification code of the user becoming known to the central facility and without the first verification code regimen becoming known to the user. This, changes in users need impact only on the second verification code regimen and not on the first.

Figure 5:
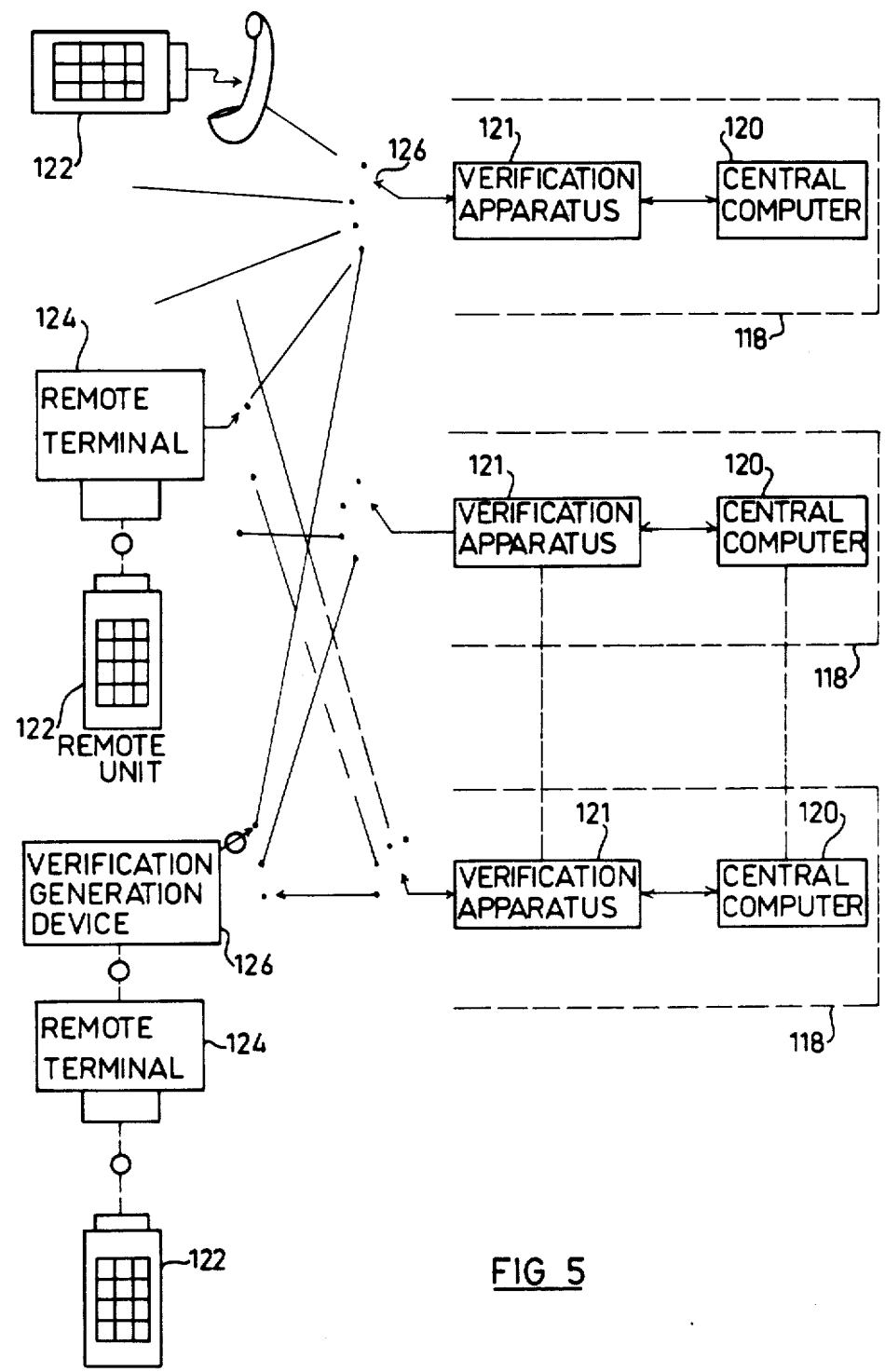
FIG. 5 is a block diagram illustration of a multiple network, multi-level verification system constructed and operative in accordance with another preferred embodiment of the present invention.

Reference is now made to FIG. 5, which is a block diagram illustration of a multi-network multi-level verification system constructed and operative in accordance with an embodiment of the invention. In accordance with this embodiment there are provided a number of networks 118, each essentially equivalent to the system of FIG. 4 and including a central computer 120 and code verification apparatus 121. An important additional feature is in that the remote units 122 are suitable for operation with a plurality of different networks, i.e. a plurality of different second verification code regimens. A further important feature is that the remote units may be employed in communication with a remote terminal 124, which may either be dedicated to a single network or operate selectably with a plurality of networks. Alternatively, the remote unit 122 may communicate directly with the central code verification apparatus of a network over ordinary telephone lines 126. It is appreciated that the same remote unit 122 may operate either with remote terminals or via telephone lines without requiring additional interface equipment.

Such a feature may be implemented preferably using the embodiment of a remote unit illustrated in FIGS. 1 and 3. A plurality of different keys may be used, one for each communicator. The communicator may be a network or an intermediate level code verification device. The choice of keys may be made by the user, or alternatively by the remote terminal of a particular network, in a handshaking arrangement as described hereinabove.

According to a further embodiment of the invention, one or more additional levels of verification code regimens may be interposed between the remote unit 122 and the code verification apparatus of the network. As seen in FIG. 5, for example, a remote unit 122 may communicate with a remote terminal 124 via a second verification regimen. The remote terminal 124 communicates, in turn, with an intermediate level code verification/generation device 126 via a third verification regimen. The intermediate level code verification/generation device 126 communicates, in turn, with the network code verification apparatus 121 via the first verification regimen.

In this manner a user holding a single remote password authentication device may operate in different networks, such as banks, stores, businesses, schools, with the same device, without compromising his individual password or encryption keys, since the password transmitted to the various remote terminals is not the same.

It will be appreciated by persons skilled in the art that the present invention is not limited to what has been particularly shown and described herein. Rather the scope of the present invention is defined only by the claims which follow:

I claim:

1. A remote authorization verification system comprising:
   a central device including:
   data input and output facilities for communicating user authorization verification data with a plurality of hand held, pocket size remote units and providing an output indication of user authorization status,
   a memory for storing predetermined user authorization verification data for comparison purposes including coding keys, each of which is synchronized with the coding key of each of said remote units and
   data comparison facilities for comparing user authorization verification data received from said plurality of hand held, pocket size remote units with user authorization verification data stored in said memory for determining whether authorization exists; and
   a plurality of hand held, pocket size remote units providing data communication with said central device via conventional telecommunications devices, said pocket size remote units each including:
   information input keying means, for receiving a user memorized password code,
   verification means for confirming receipt of a correct user memorized password code assigned to each individual remote unit and means for providing an enabling output in response to receipt of said correct password code by said verification means, a memory for storing a coding key, and
   enciphering means operative when enabled by said enabling output, and in accordance with said coding key for providing an enciphered verification code for transmission to said central device for indicating the authorized status of a user,
   each of said remote units being operative to produce an enciphered verification code by employing the coding key stored in its memory in response to the password code inputted through its information input keying means, said verification code being different for each entry of said correct password code.

2. A system according to claim 1 and wherein said enciphering means employs a key having at least first and second parts, said first part being selectably determined and being retained in said memory means and said second part being changed each time the key is used for encryption.

3. A system according to claim 2 and wherein said enciphering means also comprises sequence generating means for generating said second part of said key.

4. A system according to claim 3 and wherein said central unit comprises sequence verification means for ascertaining the genuineness of said second part.

5. A system according to claim 1 wherein each of said plurality of remote units comprises a housing and means for disabling operation of said remote unit in response to attempted tampering therewith.

6. A system according to claim 1 and also comprising means for providing an alarm communication to said central device in response to tampering with or unauthorized use of said at least one remote terminals, unauthorized use being inputting of an incorrect password code at least a predetermined number of times.

7. A system according to claim 1 and wherein said remote units comprise means for transmitting an alarm communication to said central device in response to attempted unauthorized use of said at least one remote terminal, unauthorized use being inputting of an incorrect password code at least a predetermined number of times.

8. Apparatus according to claim 1 and wherein said central device includes voice generation means for providing information to the user via said telecommunications device in voice form.

9. A remote authorization verification system comprising:
 a plurality of central devices each including:
  data input and output facilities for communicating user authorization verification data with a plurality of hand held, pocket size remote units and providing an output indication of user authorization status,
  a memory for storing predetermined user authorization verification data for comparison purposes including coding keys, each of which is synchronized with a coding key assigned to each of said remote units and which corresponds to a given one of said plurality of central devices; and
  data comparison facilities for comparing user authorization vertification data received from said plurality of hand held, pocket size remote units with user authorization vertification data stored in said memory for determining whether authorization exists; and
 a plurality of hand held, pocket size remote units providing data communication with said plurality of central devices via conventional telecommunications devices, said pocket size remote units each including:
  information input keying means, for receiving a user memorized password code and central device identification data,
  verification means for confirming receipt of a correct user memorized password code assigned to each individual remote unit;
  means for providing an enabling output in response to receipt of said correct password code by said verification means, and
  a memory for storing a plurality of coding keys and enciphering means operative when enabled by said enabling output, and in accordance with a coding key determined by said central device identification data for providing a non-repeating enciphered verification code for transmission to the central device identified by said central device identification data for indicating the authorized status of a user, said enciphering means including means for generating verification codes which are different for each entry of said correct password code.

10. A system according to claim 9 and wherein said enciphering means employs a key having at least first and second parts, said first part being selectably determined and being retained in said memory means and said second part being changed each time the key is used for encryption.

11. A system according to claim 10 and wherein said encyphering means also comprises sequence generating means for generating said second part of said key.

12. A system according to claim 11 and wherein said central device comprises sequence verification means for ascertaining the genuineness of said second part.

13. A system according to claim 9 and wherein said remote units each comprise:
 transducer means for acoustic coupling with a telephone handset; and
 modem means.

14. A system according to claim 9 and wherein said enciphering means is operative such that said enciphered verification code cannot be used to determine said password code, whereby said memorized password code is not available or made available in any form beyond said remote unit.

15. A system according to claim 9 and wherein each of said plurality of remote units comprises a housing and means for disabling operation of said remote unit in response to attempted tampering therewith.

16. A system according to claim 9 and also comprising means for providing an alarm communication to said plurality of central devices in response to attempted tampering with or unauthorized use of said at least one remote terminals, unauthorized use being inputting of an incorrect password code at least a predetermined number of times.

17. A system according to claim 9 and wherein said remote units comprise means for transmitting an alarm communication to said central devices in response to attempted unauthorized use of said at least one remote terminal, unauthorized use being inputting of an incorrect password code at least a predetermined number of times.

* * * * *